United States Patent [19]

Zimmer et al.

[11] Patent Number: 5,760,110

[45] Date of Patent: Jun. 2, 1998

[54] PROCESS FOR THE PREPARATION OF A PARTICULAR REINFORCED RUBBER COMPOSITION

[75] Inventors: Rene Jean Zimmer, Howald; Uwe Ernst Frank, Ettelbruck; Friedrich Visel, Bofferdange, all of Luxembourg; Thierry Florent Edme Materne, Attert, Belgium; Giorgio Agostini, Colmar-Berg, Luxembourg

[73] Assignee: The Goodyear Tire & Rubber Company, Akron, Ohio

[21] Appl. No.: 801,426

[22] Filed: Feb. 18, 1997

Related U.S. Application Data

[60] Provisional application No. 60/013,215, Mar. 6, 1996.

[51] Int. Cl.$^6$ .............. C08K 5/46; C08K 3/08; C08K 3/34
[52] U.S. Cl. .............. 524/83; 524/441; 524/450; 524/493; 524/496
[58] Field of Search .............. 524/83, 441, 450, 524/493, 496

[56] References Cited

U.S. PATENT DOCUMENTS

| 4,517,336 | 5/1985 | Wolff et al. | 524/571 |
| 5,569,721 | 10/1996 | Scholl et al. | 525/332.7 |

FOREIGN PATENT DOCUMENTS

| 0447066 | 2/1991 | European Pat. Off. | C08L 9/00 |
| 0620250 | 3/1994 | European Pat. Off. | C08L 9/00 |
| 0683203 | 5/1995 | European Pat. Off. | C08L 21/00 |
| 0732362 | 3/1996 | European Pat. Off. | C08L 21/00 |

Primary Examiner—Kriellion S. Morgan
Attorney, Agent, or Firm—Bruce J. Hendricks

[57] ABSTRACT

The invention relates to a process for the preparation of a rubber composition involving thermomechanically mixing in a preparatory mixing step at least one sulfur vulcanizable elastomer, a particulate filler and an unsymmetrical organosilicon disulfide compound of the formula

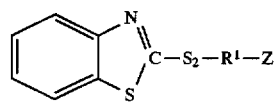

wherein Z is selected from the group consisting of:

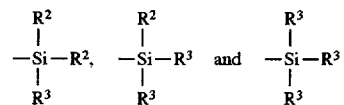

wherein $R^2$ may be the same or different and is independently selected from the group consisting of an alkyl group having 1 to 4 carbons and phenyl; $R^3$ may be the same of different and is independently selected from the group consisting of alkoxy groups having 1 to 8 carbon atoms and cycloalkoxy groups with 5 to 8 carbon atoms; and $R^1$ is selected from the group consisting of a substituted or unsubstituted alkylene group having a total of 1 to 18 carbon atoms and a substituted or unsubstituted arylene group having a total of 6 to 12 carbon atoms.

11 Claims, No Drawings

PROCESS FOR THE PREPARATION OF A PARTICULAR REINFORCED RUBBER COMPOSITION

This application claims the benefit of U.S. Provisional Application 60/013,215 filed Mar. 6, 1996.

FIELD

This invention relates to the preparation of rubber compositions which contain silica reinforcement and utilizing an unsymmetrical organosilicon disulfide silica coupler. The invention also relates to the preparation of tires having treads made with the above compositions.

BACKGROUND OF THE INVENTION

For various applications utilizing rubber which require high strength and abrasion resistance, particularly applications such as tires and various industrial products, sulfur-cured rubber is utilized which contains substantial amounts of particulate fillers. Carbon black is commonly used for such purpose and normally provides or enhances good physical properties for the sulfur-cured rubber. Additional types of particulate fillers commonly used in rubber include silica, alumina and aluminosilicate.

It is important to appreciate that, conventionally, carbon black is a considerably more effective reinforcing filler for rubber products and particularly for rubber tire treads than silica unless the silica is used in conjunction with a coupling agent, which may sometimes be referred to as a silica coupler or silica adhesive compound or coupling agent.

Numerous coupling agents are taught for use in combining silica and rubber, such as, for example, silane coupling agents containing a polysulfide component or structure in which the polysulfide bridge portion may be composed of from 2 to 8 sulfur units, such as, for example, an organosilane polysulfide sometimes referred to as bis-(3-triethoxysilylpropyl)tetrasulfide, available from Degussa GmbH, for example, as Si69. It is understood that the sulfur bridge portions of such "tetrasulfide," while having an average of about 3.5 to about 4 connecting sulfur atoms, actually has from about 2 to about 6 or 8 connecting sulfur atoms in its bridge portions where not more than 25 percent of its bridge portions contain two connecting sulfur atoms. Therefore, it is considered herein that at least 75 percent of its sulfur bridge portions contain three or more connecting sulfur atoms. For example, see U.S. Pat. Nos. 4,076,550, 4,704,414 and 3,873,489.

It is recognized that such organosilane polysulfides which contain three or more connecting sulfur atoms in their sulfur bridges can also act as a sulfur donor for the liberation of free sulfur to participate in a vulcanization, or partial vulcanization, of a sulfur vulcanizable elastomer since free sulfur may be liberated there from at a temperature of, for example, about 150° C. above. It is considered herein that such recited temperature is approximate in nature and is dependent upon a choice of various individual organosilane polysulfides as well as other factors, although it is believed that at temperatures lower than about 150° C. for most practical organosilane polysulfides which contain from three to eight sulfur atoms in their sulfur bridge portions the liberation of free sulfur, if any, occurs at a relatively slow rate.

Such temperatures may be experienced, for example, in preparatory or what is often called non-productive mixing step for blending rubber and rubber compounding ingredients, typically exclusive of addition of free sulfur, sulfur donors and/or rubber vulcanization accelerators. Such mixing might typically occur, for example, at a temperature in a range of up to about 140° C. to about 180° C.; and most likely at least a portion of the mixing occurs at a temperature of at least 160° C. or above. The small amount of free, liberated sulfur is then available to combine with and/or possibly partially vulcanize the unsaturated elastomer with which the silica and coupler are being mixed in such mixing stages.

U.S. Pat. No. 4,820,751 discloses a rubber composition for tires containing a particular surface-treated carbon black, silica and silane coupling agents of the formula

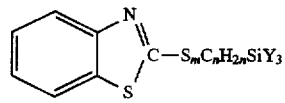

where m and n is an integer of from 1 to 6 and Y is an alkyl group or an alkoxyl group having from 1 to 4 carbon atoms.

SUMMARY AND PRACTICE OF THE INVENTION

In accordance with one aspect of this invention, a rubber composition is prepared by a process which comprises the sequential steps of:

(A) thermomechanically mixing in at least one preparatory mixing step to a temperature of about 140° C. to about 190° C., for a total mixing time of about 2 to about 20 minutes (i) 100 parts by weight of at least one sulfur vulcanizable elastomer selected from conjugated diene homopolymers and copolymers and copolymers of at least one conjugated diene and aromatic vinyl compound; (ii) about 15 to about 100 phr of particulate filler selected from the group consisting of precipitated silica, alumina, aluminosilicate, carbon black and mixtures thereof; (iii) about 0.05 to about 20 parts by weight per part by weight of said particulate filler of at least one unsymmetrical organosilicon disulfide compound having the formula:

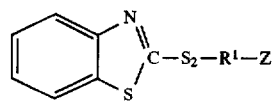

wherein Z is selected from the group consisting of:

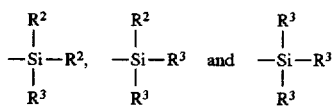

wherein $R^2$ may be the same or different and is independently selected from the group consisting of alkyl group having 1 to 4 carbons and phenyl; $R^3$ may be the same or different and is independently selected from the group consisting of alkoxy groups having 1 to 8 carbon atoms and cycloalkoxy groups with 5 to 8 carbon atoms; and $R^1$ is selected from the group consisting of a substituted or unsubstituted alkylene group having a total of 1 to 18 carbon atoms and a substituted or unsubstituted arylene group having a total of 6 to 12 carbon atoms; and (iv) at least one sulfur donor having a property of releasing at least a portion of sulfur at a temperature in a range of about 140° C. to about 190° C. and selected from the group consisting of elemental sulfur, an amine disulfide, polymeric polysulfide and sulfur olefin adducts; provided, however, that the total of said free sulfur from said sulfur donor addition is in a range of about 0.05 to about 2 phr; and (B) subsequently blending therewith, in a final thermomechanical mixing step at a temperature to about 100° C. to about 130° C. for a time of about 1 to about 3 minutes, about 0.4 to about 3 phr of elemental sulfur provided, however, that the total free sulfur available from said sulfur donor addition introduced in said preparatory mixing steps and elemental sulfur added in said final mixing step is in a range of about 0.45 to about 5 phr.

DETAILED DESCRIPTION

The term "phr" as used herein, and according to conventional practice, refers to "parts of a respective material per 100 parts by weight of rubber, or elastomer."

In the description of this invention, the terms "rubber" and "elastomer," if used herein, may be used interchangeably, unless otherwise prescribed. The terms such as "rubber composition," "compounded rubber" and "rubber compound," if used herein, are used interchangeably to refer to rubber which has been blended or mixed with various ingredients and materials and "rubber compounding" or "compounding" may be used to refer to the mixing of such materials. Such terms are well known to those having skill in the rubber mixing or rubber compounding art.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha methyl styrene. Thus, it is considered that the elastomer is a sulfur-curable elastomer. Such diene-based elastomer, or rubber, may be selected, for example, from at least one of cis 1,4-polyisoprene rubber (natural and/or synthetic), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, cis 1,4-polybutadiene, medium vinyl polybutadiene rubber (35–50 percent vinyl), high vinyl polybutadiene rubber (50–75 percent vinyl), styrene/isoprene copolymers, emulsion polymerization prepared styrene/butadiene/acrylonitrile terpolymer rubber and butadiene/acrylonitrile copolymer rubber.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR might be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50 percent. In one aspect, the E-SBR may also contain acrylonitrile to form a terpolymer rubber, as E-SBR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the terpolymer are also contemplated as diene-based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-polyisoprene elastomer and use thereof is more fully described in U.S. Pat. No. 5,087,668 which is incorporated herein by reference.

The cis 1,4-polybutadiene rubber is considered to be beneficial for a purpose of enhancing the tire tread's wear or treadwear.

Such polybutadiene elastomer can be prepared, for example, by organic solution polymerization of 1,3-butadiene as is well known to those having skill in such art.

The polybutadiene elastomer may be conveniently characterized, for example, by having at least a 90 percent cis 1,4-content.

The cis 1,4-polyisoprene and cis 1,4-polyisoprene natural rubber are well known to those having skill in the rubber art.

A reference to an elastomer's Tg, if used herein, refers to a glass transition temperature which can be determined by a differential scanning calorimeter at a heating rate of 10° C. per minute.

The process of the present invention involves use of from 15 to about 100 phr of a particulate filler selected from the group consisting of precipitated silica, alumina, aluminosilicate, carbon black and mixtures thereof. The vulcanized rubber composition should contain a sufficient amount of particulate filler to contribute a reasonably high modulus and high resistance to tear. The combined weight of the silica, alumina, aluminosilicates and carbon black, as hereinbefore referenced, may be as low as about 15 phr, but is more preferably from about 35 to about 90 phr.

While it is considered herein that commonly employed siliceous pigments used in rubber compounding applications might be used as the silica in this invention, including pyrogenic and precipitated siliceous pigments (silica) alumina, aluminosilicates, precipitated silicas are preferred.

The siliceous pigments preferably employed in this invention are precipitated silicas such as, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 350, and more usually about 150 to about 300.

Further, the silica, as well as the aforesaid alumina and aluminosilicate may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used.

The average mercury porosity specific surface area for the silica should be in a range of about 100 to 300 m²/g.

A suitable pore-size distribution for the silica, alumina and aluminosilicate according to such mercury porosity evaluation is considered herein to be five percent or less of its pores have a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention, such as, only for example herein, and without limitation, silicas commercially available from PPG Industries under the Hi-Sil trademark with designations Hi-Sil 210, 243, EZ, etc; silicas available from Rhone-Poulenc with, for example, designation of Zeosil® 1165MP, silicas available from Degussa GmbH with, for example, designations VN2, VN3, BV33806R, etc, and silicas commercially available from Huber having, for example, a designation of Hubersil 8745.

Representative examples of alumina for the purposes of this invention are natural and synthetic aluminum oxide ($Al_2O_3$). Such alumina can be suitably synthetically prepared, for example, by controlled precipitation of aluminum hydroxide. For example, neutral, acidic and basic $Al_2O_3$ can be obtained from the Aldrich Chemical Company. In the practice of this invention, the neutral alumina is preferred; however, it is considered herein that the acidic, basic and neutral forms of alumina could be used. The neutral or substantially neutral form is indicated as being preferential in order to use a form with reduced number of surface —OH groups as compared to the acidic form and, also, to reduce the basic sites of the alumina which are AlO-ions, representing a strong base, in order to reduce potential interferences with the desired reactions of the alumina with the organosilane disulfide coupler.

Representative examples of aluminosilicates for the purposes of this invention are, for example but not intended to be limited to, Sepiolite as a natural aluminosilicate which might be obtained as PANSIL® from Tolsa S.A., Toledo, Spain and SILTEG® as a synthetic aluminosilicate from Degussa GmbH. Such aluminosilicates can be used as natural materials or synthetically prepared, for example, as hereinbefore exemplified.

Where it is desired for the rubber composition, which contains both a silicious filler such as silica, alumina and/or aluminosilicates and also carbon black reinforcing pigments, to be primarily reinforced with silica as the reinforcing pigment, it is often preferable that the weight ratio of such silicious pigments silicates to carbon black is at least 3/1 and preferably at least 10/1 and, thus, in a range of about 3/1 to about 30/1.

The filler is comprised of about 15 to about 95 weight percent precipitated silica, alumina and/or aluminosilicate and, correspondingly, about 5 to about 85 weight percent carbon black; wherein the said carbon black has a CTAB value in a range of about 80 to about 150. Preferably, said filler can be comprised of about 60 to about 95 weight percent of said silica, alumina and/or aluminosilicate and, correspondingly, about 40 to about 5 weight percent carbon black.

Representative organosilicon disulfide compounds used in accordance with the present invention include 2-benzothiazyl-(3-triethoxysilyl)propyl disulfide; 2-benzothiazyl-(2-trimethoxysilylethyl) disulfide; 2-benzothiazyl-(3-trimethoxysilylpropyl) disulfide; 2-benzothiazyl-(2-triethoxysilylpropyl) disulfide; 2-benzothiazyl-(2-tripropoxysilylethyl) disulfide; 2-benzothiazyl-(2-tri-sec-butoxysilylethyl) disulfide; 2-benzothiazyl-(2-tri-t-butoxysilylethyl) disulfide; 2-benzothiazyl-(3-triisopropoxysilylpropyl) disulfide; 2-benzothiazyl-(3-trioctoxysilylpropyl) disulfide; 2-benzothiazyl-( 2-2'-ethylhexoxysilylethyl) disulfide; 2-benzothiazyl-(2-dimethoxy ethoxysilylethyl) disulfide; 2-benzothiazyl-(3-methoxyethoxypropoxysilylpropyl) disulfide; 2-benzothiazyl-(3-dimethoxymethylsilylpropyl) disulfide; 2-benzothiazyl-(3-methoxy dimethylsilylpropyl) disulfide; 2-benzothiazyl-(3-diethoxymethylsilylpropyl) disulfide; 2-benzothiazyl-(3-ethoxydimethylsilylpropyl) disulfide; 2-benzothiazyl-(3-cyclohexoxy dimethylsilylpropyl) disulfide; 2-benzothiazyl-(4-trimethoxysilylbutyl) disulfide; 2-benzothiazyl-(3-trimethoxysilyl-3-methylpropyl) disulfide; 2-benzothiazyl-(3-tripropoxysilyl-3-methylpropyl) disulfide; 2-benzothiazyl-(3-dimethoxy methylsilyl-3-ethylpropyl) disulfide; 2-benzothiazyl-(3-trimethoxysilyl-2-methylpropyl) disulfide; 2-benzothiazyl-(3-dimethoxyphenylsilyl-2-methylpropyl) disulfide; 2-benzothiazyl-(3-trimethoxysilylcyclohexyl) disulfide; 2-benzothiazyl-(12-trimethoxysilyldodecyl) disulfide; 2-benzothiazyl-(12-triethoxysilyldodecyl) disulfide; 2-benzothiazyl-(18-trimethoxysilyloctadecyl) disulfide; 2-benzothiazyl-(18-methoxydimethylsilyloctadecyl) disulfide; 2-benzothiazyl-(2-trimethoxysilyl-2-methylethyl) disulfide; 2-benzothiazyl-(2-tripropoxysilyl-2-methylethyl) disulfide; 2-benzothiazyl-(2-trioctoxysilyl-2-methylethyl) disulfide; 2-benzothiazyl-(2-trimethoxysilyl-phenyl) disulfide; 2-benzothiazyl-(2-triethoxysilyl-phenyl) disulfide; 2-benzothiazyl-(2-trimethoxysilyl-tolyl)disulfide; 2-benzothiazyl-(2-triethoxysilyl-tolyl)disulfide; 2-benzothiazyl-(2-trimethoxysilyl-methyl tolyl) disulfide; 2-benzothiazyl-(2-triethoxysilyl-methyl tolyl) disulfide; 2-benzothiazyl-(2-trimethoxysilyl-ethyl phenyl) disulfide; 2-benzothiazyl-(2-triethoxysilyl-ethyl phenyl) disulfide; 2-benzothiazyl-(2-trimethoxysilyl-ethyl tolyl) disulfide; 2-benzothiazyl-(2-triethoxysilyl-ethyl tolyl) disulfide; 2-benzothiazyl-(3-trimethoxysilyl-propyl phenyl) disulfide; 2-benzothiazyl-(3-triethoxysilyl-propyl phenyl) disulfide;

2-benzothiazyl-(3-trimethoxysilyl-propyl tolyl) disulfide; and 2-benzothiazyl-(3-triethoxysilyl-propyl tolyl) disulfide.

With reference to the above formula, preferably $R^1$ is a alkylene group having 1 to 3 carbon atoms Z is

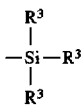

and $R^3$ is an alkoxy group having from 1 to 3 carbon atoms

The unsymmetrical organosilicon disulfide compounds used in the present invention may be prepared by reacting (a) a sulfenamide compound of the formula

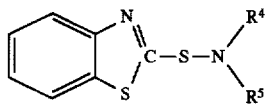

where $R^4$ is selected from the group consisting of hydrogen, acyclic aliphatic groups having from 1 to 10 carbon atoms and cyclic aliphatic groups having from 5 to 10 carbon atoms; and $R^5$ is selected from the group consisting of acyclic aliphatic groups having 1 to 10 carbon atoms and cyclic aliphatic groups having from 5 to 10 carbon atoms; with (b) a mercaptosilane compound of the formula

Z—R¹—SH wherein Z is selected from the group consisting of

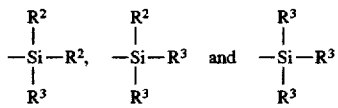

wherein $R^3$ may be the same or different and is independently selected from the group consisting of an alkyl group having 1 to 4 carbon and phenyl; $R^3$ may be the same of different and is independently selected from the group consisting of alkoxy groups having 1 to 8 carbon atoms and cycloalkoxy groups with 5 to 8 carbon atoms; and $R^1$ is selected from the group consisting of a substituted or unsubstituted alkylene group having a total of 1 to 18 carbon atoms and a substituted or unsubstituted arylene group having a total of 6 to 12 carbon atoms.

Representative examples of sulfenamide compounds include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide, N,N-dimethyl-2-benzothiazylsulfenamide, N,N-diethyl-2-benzothiazylsulfenamide, N,N-dipropyl-2-benzothiazylsulfenamide, N,N-diisopropyl-2-benzothiazylsulfenamide and N,N-diphenyl-2-benzothiazylsulfenamide. Preferably, the sulfenamide is N-cyclohexyl-2-benzothiazylsulfenamide.

Representative examples of mercaptosilane compounds include 2-mercaptoethyl trimethoxysilane, 3-mercaptopropyl trimethoxysilane, 3-mercaptopropyl triethoxysilane, 2-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane; 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl diethoxy methylsilane, 3-mercaptopropyl ethoxy dimethylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane; 2-mercaptotolyl trimethoxysilane; 2-mercaptotolyl triethoxysilane; 2-mercaptomethyltolyl trimethoxysilane; 2-mercaptomethyltolyl triethoxysilane; 2-mercaptoethylphenyl trimethoxysilane; 2-mercaptoethylphenyl triethoxysilane; 2-mercaptoethyltolyl trimethoxysilane; 2-mercaptoethyltolyl triethoxysilane; 3-mercaptopropylphenyl trimethoxysilane; 3-mercaptopropylphenyl triethoxysilane; 3-mercaptopropyltolyl trimethoxysilane; and 3-mercaptopropyltolyl triethoxysilane.

The molar ratio of the sulfenamide compound to the mercaptosilane compound may range from 1:5 to 5:1. Preferably, the molar ratio ranges from 1:3 to 3:1 with a range of from 1:1 to 1:2 being particularly preferred. As can be appreciated by the teachings herein, by varying the molar ratio of the compound of formula III to the compound of formula IV, one produces varying weight percentage of the symmetrical organosilicon disulfide of formula I and the unsymmetrical organosilicon disulfide for formula II.

The reaction should be conducted in the absence of water because the presence of a alkoxysilane moiety may be hydrolysed by contact with water.

The reaction may be conducted in the presence of an organic solvent. Suitable solvents which may be used include chloroform, dichloromethane, carbon tetrachloride, hexane, heptane, cyclohexane, xylene, benzene, dichloroethylene, trichloroethylene, dioxane, diisopropyl ether, tetrahydrofuran and toluene. As indicated above, care should be exercised to avoid the presence of water during the reaction. Therefore, none of the above solvent should contain any appreciable levels of water. Preferably, the organic solvent is chloroform, heptane, xylene, cyclohexane or toluene.

The reaction may be conducted over a variety of temperatures. Generally speaking, the reaction is conducted in a temperature ranging from 20° C. to 140° C. Preferably, the reaction is conducted at a temperature ranging from 50° C. to 90° C.

The reaction may be conducted at a variety of pressures. Generally speaking, however, the reaction is conducted at a pressure ranging from 0.096 to 4.83 kg/cm².

The unsymmetrical organosilicon disulfide compounds may also be prepared by the reaction scheme listed below:

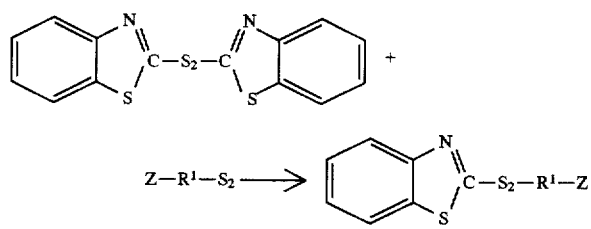

or the reaction scheme:

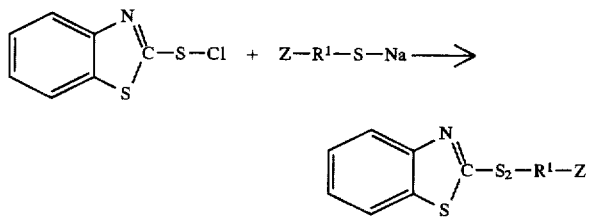

In the practice of the invention, at least one sulfur donor having a property of releasing at least the portion of sulfur at a temperature in a range of about 140° C. to about 190° C. is used in a preparatory step., the amount of sulfur donor introduced into the preparatory mixing is, generally, in a range of about 0.05 to about 2 phr, preferably about 0.2 to about 1 phr. Such sulfur donor may be, for example, in a form of elemental sulfur ($S_8$), or anamine disulfide, polymeric polysulfide, sulfur olefin adducts and mixtures thereof. Preferably, the sulfur donor is elemental sulfur.

The amount of free sulfur source addition to the mixture can be controlled or manipulated as a matter of choice relatively independently from the addition of the unsymmetrical organosilicon disulfide. Thus, for example, the independent addition of sulfur donor may be manipulated by the amount of addition thereof and by sequence of addition relative to addition of other ingredients to the rubber mixture such as, for example, the silica reinforcement.

In such manner, then the unsymmetrical organosilane disulfide, with its two connecting sulfur atoms, could be utilized for reaction with the silica and sulfur vulcanizable elastomer and the independent addition of the sulfur donor, particularly a free sulfur source, could be primarily relied upon for the vulcanization of the elastomer.

In one aspect of the invention, such process is provided wherein said preparatory mixing is conducted in at least two thermomechanical mixing steps of which at least two of such mixing steps are to a temperature in a range of about 140° C. to about 190° C., with intermediate cooling of the rubber composition between at least two of said mixing steps to a temperature below about 50° C.

In further accordance with this invention, a rubber composition is prepared wherein preparatory steps (A) are composed of at least two sequential mixing steps in which said elastomer, said particulate filler and said unsymmetrical organosilicon disulfide compound are mixed in one or more sequential mixing steps and in which said sulfur donor is added in a subsequent sequential preparatory mixing step.

In additional accordance with another embodiment, a rubber composition is prepared wherein said preparatory steps (A) are composed of at least two sequential mixing steps in which about 20 to about 60 weight percent of the silica, the said unsymmetrical organosilicon disulfide compound and said sulfur donor is added in the first mix step and the remainder thereof added in at least one subsequent preparatory mix step.

In accordance with another embodiment, the unsymmetrical organosilicon disulfide is optionally added to the thermomechanical preparatory mixing in a form of a particulate comprised of (a) about 25 to about 75, preferably about 40 to about 60, weight percent of said unsymmetrical organosilane polysulfide compound and, correspondingly, (b) about 75 to about 25, preferably about 60 to about 40, weight percent particulate carbon black. One advantage of this embodiment is providing the unsymmetrical organosilicon disulfide in a form of a particulate so as to add the unsymmetrical organosilicon disulfide in a form of a relatively dry, or substantially dry, powder in which the carbon black acts as a carrier for the unsymmetrical organosilicon disulfide since it is considered herein that the unsymmetrical organosilane disulfide would normally otherwise be in a liquid, or substantially liquid. A contemplated benefit for the particulate is to aid in the dispersing of the unsymmetrical organosilicon disulfide in the preparatory mixing step(s) of the process of this invention and to aid in the introduction of the unsymmetrical organosilicon disulfide into the preparatory mixing of the rubber composition mixture.

In further accordance with the invention, the process comprises the additional step of vulcanizing the prepared rubber composition at a temperature in a range of about 140° C. to about 190° C.

Accordingly, the invention also thereby contemplates a vulcanized rubber composition prepared by such process.

In additional accordance with the invention, the process comprises the additional steps of preparing an assembly of a tire or sulfur-vulcanizable rubber with a tread comprised of the said rubber composition prepared according to the process of this invention and vulcanizing the assembly at a temperature in a range of about 140° C. to about 190° C.

Accordingly, the invention also thereby contemplates a vulcanized tire prepared by such process.

It is readily understood by those having skill in the art that the rubber composition may additionally contain various commonly used additive materials such as, for example. curing aids, such as sulfur, activators, retarders and accelerators, processing additives, such as oils, resins including tackifying resins, plasticizers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts.

Typical amounts of reinforcing-type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. As known to those skilled in the art, sulfur vulcanizing agents are used, or added in the productive mixing stage, in an amount ranging from about 0.4 to about 3 phr, or even, in some circumstances, up to about 8 phr, with a range of from about 1.5 to about 2.5, sometimes from 2 to 2.5, being usually preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber composition of this invention can be used for various purposes. For example, it can be used for various tire compounds. Such tires can be built, shaped, molded and cured by various methods which are known and will be readily apparent to those having skill in such art.

While certain representative embodiments and details have been described for the purpose of illustrating the invention, it will be apparent to those skilled in this art that various changes and modifications may be made therein without departing from the spirit or scope of the invention.

What is claimed is:

1. A process of preparing a rubber composition which comprises the sequential steps of:

(A) thermomechanically mixing in at least one preparatory mixing step to a temperature of about 140° C. to about 190° C. for a total mixing time of about 2 to about 20 minutes (i) 100 parts by weight of at least one sulfur vulcanizable elastomer selected from conjugated diene homopolymers and copolymers and copolymers of at least one conjugated diene and aromatic vinyl compound; (ii) about 15 to about 100 phr of particulate filler selected from the group consisting of precipitated silica, alumina, aluminosilicate, carbon black and mixtures thereof; (iii) about 0.05 to about 20 parts by weight per part by weight of said particulate filler of at least one unsymmetrical organosilicon disulfide compound having the formula:

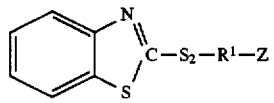

wherein Z is selected from the group consisting of:

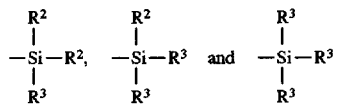

wherein $R^2$ may be the same or different and is independently selected from the group consisting of an alkyl group having 1 to 4 carbons and phenyl; $R^3$ may be the same or different and is independently selected from the group consisting of alkoxy groups having 1 to 8 carbon atoms and cycloalkoxy groups with 5 to 8 carbon atoms; and $R^1$ is selected from the group consisting of a substituted or unsubstituted alkylene group having a total of 1 to 18 carbon atoms and a substituted or unsubstituted arylene group having a total of 6 to 12 carbon atoms; and (iv) at least one sulfur donor having a property of releasing at least a portion of sulfur at a temperature in a range of about 140° C. to about 190° C. and selected from the group consisting of elemental sulfur, an amine disulfide, polymeric polysulfide and sulfur olefin adducts; provided, however, that the total free sulfur from said sulfur donor addition is in a range of about 0.05 to about 2 phr; and (B) subsequently blending therewith, in a final thermomechanical mixing step at a temperature to about 100° C. to about 130° C. for a time of about 1 to about 3 minutes, about 0.4 to about 3 phr of elemental sulfur provided, however that the total of free sulfur introduced in said preparatory mixing steps and elemental sulfur added in said final mixing step is in a range of about 0.45 to about 5 phr.

2. The process of claim 1 wherein said preparatory mixing is conducted in at least two thermomechanical mixing steps, wherein at least two of such mixing steps are to a temperature of about 140° C. to about 190° C., with intermediate cooling of the rubber composition between at least two of the said mixing steps to a temperature below about 50° C.

3. The process of claim 1 which comprises the additional step of vulcanizing the prepared rubber composition at a temperature in a range of from about 140° C. to about 190° C.

4. A vulcanized rubber composition prepared according to the process of claim 3.

5. The process of claim 1 which comprises the additional steps of preparing an assembly of a tire of sulfur vulcanizable rubber with a tread comprised of the said rubber composition and vulcanizing the assembly at a temperature in a range of about 140° C. to about 190° C.

6. A vulcanized rubber tire prepared according to the process of claim 5.

7. The process of claim 1 where said sulfur vulcanizable elastomer is selected from at least one of natural and synthetic cis 1,4-polyisoprene rubber, emulsion polymerization prepared styrene/butadiene copolymer rubber, organic solution polymerization prepared styrene/butadiene copolymer rubber, 3,4-polyisoprene rubber, isoprene/butadiene rubber, styrene/isoprene/butadiene terpolymer rubbers, cis 1,4-polybutadiene rubber, medium vinyl polybutadiene rubber (35-50 percent vinyl), high vinyl polybutadiene (50-75 percent vinyl) and emulsion polymerization prepared styrene/butadiene/acrylonitrile terpolymer rubber and butadiene/acrylonitrile copolymer rubber.

8. The process of claim 1 wherein the silica is characterized by having a BET surface area in a range of about 100 to about 300 square meters per gram and a dibutylphthalate (DBP) absorption value in a range of about 150 to about 350, a CTAB value in a range of about 100 to about 220, and a mercury porosimetry pore size distribution of 5 percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.

9. The process according to claim 1 in which said particulate filler comprises from about 15 to about 95 weight percent precipitated silica and, correspondingly, from 5 to about 85 weight percent carbon black; wherein said carbon black is has a CTAB value in a range of about 80 to about 150.

10. The process of claim 1 wherein said unsymmetrical organosilicon disulfide is selected from the group consisting of 2-benzothiazyl-(3-triethoxysilyl)propyl disulfide; 2-benzothiazyl-(2-trimethoxysilylethyl) disulfide; 2-benzothiazyl-(3-trimethoxysilylpropyl) disulfide; 2-benzothiazyl-(2-triethoxysilylpropyl) disulfide; 2-benzothiazyl-(2-tripropoxysilylethyl) disulfide; 2-benzothiazyl-(2-tri-sec-butoxysilylethyl) disulfide; 2-benzothiazyl-(2-tri-t-butoxysilylethyl) disulfide; 2-benzothiazyl-(3-triisopropoxysilylpropyl) disulfide; 2-benzothiazyl-(3-trioctoxysilylpropyl) disulfide; 2-benzothiazyl-(2-2'-ethylhexoxysilylethyl) disulfide; 2-benzothiazyl-(2-dimethoxy ethoxysilylethyl) disulfide; 2-benzothiazyl-(3-methoxyethoxypropoxysilylpropyl) disulfide; 2-benzothiazyl-(3-dimethoxymethylsilylpropyl) disulfide; 2-benzothiazyl-(3-methoxy dimethylsilylpropyl) disulfide; 2-benzothiazyl-(3-diethoxymethylsilylpropyl) disulfide; 2-benzothiazyl-(3-ethoxydimethylsilylpropyl) disulfide; 2-benzothiazyl-(3-cyclohexoxy dimethylsilylpropyl) disulfide; 2-benzothiazyl-(4-trimethoxysilylbutyl) disulfide; 2-benzothiazyl-(3-trimethoxysilyl-3-methylpropyl) disulfide; 2-benzothiazyl-(3-tripropoxysilyl- 3-methylpropyl) disulfide; 2-benzothiazyl-(3-dimethoxy methylsilyl-3-ethylpropyl) disulfide; 2-benzothiazyl-(3-trimethoxysilyl-2-methylpropyl) disulfide; 2-benzothiazyl-(3-dimethoxyphenylsilyl-2-methylpropyl) disulfide; 2-benzothiazyl-(3-trimethoxysilylcyclohexyl) disulfide; 2-benzothiazyl-(12-trimethoxysilyldodecyl) disulfide; 2-benzothiazyl-(12-triethoxysilyldodecyl) disulfide; 2-benzothiazyl-(18-trimethoxysilyloctadecyl) disulfide; 2-benzothiazyl-(18-methoxydimethylsilyloctadecyl) disulfide; 2-benzothiazyl-(2-trimethoxysilyl-2-methylethyl) disulfide; 2-benzothiazyl-(2-tripropoxysilyl-2-methylethyl) disulfide; 2-benzothiazyl-(2-trioctoxysilyl-2-methylethyl) disulfide; 2-benzothiazyl-(2-trimethoxysilyl-phenyl) disulfide; 2-benzothiazyl-(2-triethoxysilyl-phenyl) disulfide; 2-benzothiazyl-(2-trimethoxysilyl-tolyl)disulfide; 2-benzothiazyl-(2-triethoxysilyl-tolyl)disulfide; 2-benzothiazyl-(2-trimethoxysilyl-methyl tolyl) disulfide; 2-benzothiazyl-(2-triethoxysilyl-methyl tolyl) disulfide; 2-benzothiazyl-(2-trimethoxysilyl-ethyl phenyl) disulfide; 2-benzothiazyl-(2-triethoxysilyl-ethyl phenyl) disulfide; 2-benzothiazyl-(2-trimethoxysilyl-ethyl tolyl) disulfide; 2-benzothiazyl-(2-triethoxysilyl-ethyl tolyl) disulfide; 2-benzothiazyl-(3-trimethoxysilyl-propyl phenyl) disulfide; 2-benzothiazyl-(3-triethoxysilyl-propyl phenyl) disulfide; 2-benzothiazyl-(3-trimethoxysilyl-propyl tolyl) disulfide; and 2-benzothiazyl-(3-triethoxysilyl-propyl tolyl) disulfide.

11. The process of claim 1 wherein $R^1$ is a alkylene group having 1 to 3 carbon atoms Z is

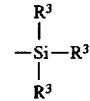

and $R^3$ is an alkoxy group having from 1 to 3 carbon atoms.

* * * * *